(12) United States Patent
Yan et al.

(10) Patent No.: US 12,273,865 B2
(45) Date of Patent: Apr. 8, 2025

(54) NBIOT FREQUENCY HOPPING (71) Applicant: LENOVO (BEIJING) LIMITED, Beijing (CN)

(72) Inventors: Zhi Yan, Beijing (CN); Haipeng Lei, Beijing (CN); Yingying Li, Beijing (CN); Lianhai Wu, Beijing (CN); Jie Shi, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 467 days.

(21) Appl. No.: 17/629,963

(22) PCT Filed: Jul. 26, 2019

(86) PCT No.: PCT/CN2019/097927
§ 371 (c)(1),
(2) Date: Jan. 25, 2022

(87) PCT Pub. No.: WO2021/016744
PCT Pub. Date: Feb. 4, 2021

(65) Prior Publication Data
US 2022/0346094 A1  Oct. 27, 2022

(51) Int. Cl.
*H04W 72/04* (2023.01)
*H04W 72/0453* (2023.01)

(52) U.S. Cl.
CPC ............... *H04W 72/0453* (2013.01)

(58) Field of Classification Search
CPC ....... H04B 1/713; H04L 5/007; H04L 5/0012; H04L 5/0082; H04L 5/0094; H04W 72/0453
See application file for complete search history.

(56) References Cited

U.S. PATENT DOCUMENTS

2015/0195069 A1* 7/2015 Yi ................ H04L 5/0053 370/329
2017/0134881 A1* 5/2017 Oh .................. H04L 5/14
(Continued)

FOREIGN PATENT DOCUMENTS

CN 107645371 A 1/2018
CN 109478902 A 3/2019
(Continued)

OTHER PUBLICATIONS

Ericsson; "NB-IOT—Design Considerations for Single Tone Frequency Hopped NB-PRACH"; R1-160093; 3GPP TSG-RAN1 NB-IOT Ad Hoc Jan. 18-20, 2016 Budapest, Hungary; Agenda Item: 2.1.2.2 (Year: 2016).*

(Continued)

*Primary Examiner* — Lan-Huong Truong
(74) *Attorney, Agent, or Firm* — Kunzler Bean & Adamson (57) ABSTRACT Methods and apparatuses for NBIoT frequency hopping are disclosed. A method comprises receiving a signal on a first number of frequency carriers, the signal switches among the first number of frequency carriers every a second number of time unit, wherein, the second number is configured by higher layer signaling, and the second number is determined by at least one of a subcarrier spacing of the signal, a scaling factor, a resource unit size of the signal, a subcarrier allocation.

20 Claims, 8 Drawing Sheets (56) References Cited

U.S. PATENT DOCUMENTS

| | | | |
|---|---|---|---|
| 2018/0020360 A1* | 1/2018 | Yerramalli | H04B 1/713 |
| 2018/0139725 A1* | 5/2018 | Takeda | H04W 72/23 |
| 2018/0279363 A1* | 9/2018 | Su | H04J 11/005 |
| 2019/0150199 A1* | 5/2019 | Cho | H04L 27/2662 370/329 |
| 2019/0380151 A1* | 12/2019 | Kim | H04W 74/0833 |
| 2020/0163111 A1* | 5/2020 | Luo | H04W 72/21 |
| 2020/0374925 A1* | 11/2020 | Su | H04B 1/713 |
| 2021/0022117 A1* | 1/2021 | Yi | H04L 5/0044 |
| 2021/0091891 A1* | 3/2021 | Phan | H04B 1/713 |
| 2021/0235496 A1* | 7/2021 | Park | H04B 1/715 |
| 2021/0297987 A1* | 9/2021 | Hwang | H04W 52/0235 |
| 2021/0329591 A1* | 10/2021 | Hwang | H04W 68/02 |
| 2022/0052797 A1* | 2/2022 | Yu | H04W 72/23 |
| 2022/0210803 A1* | 6/2022 | Liu | H04L 1/08 |

FOREIGN PATENT DOCUMENTS

| | | |
|---|---|---|
| CN | 109691208 A | 4/2019 |
| KR | 20160137860 A | 12/2016 |

OTHER PUBLICATIONS

International Searching Authority, "Written Opinion of the International Searching Authority," PCT/CN2019/097927, Apr. 10, 2020, pp. 1-4.

* cited by examiner

- Option 11: Puncture last Z (Z=1) symbol in the previous carrier
- Option 12: puncture last half symbol in the previous carrier and first half symbol in the next carrier

- Option 21: Puncture last Z (Z=1) symbol in the previous carrier
- Option 22: Puncture first Z (Z=1) symbol in the next carrier
- Option 23: puncture last half symbol in the previous carrier and first half symbol in the next carrier

NBIOT FREQUENCY HOPPING

FIELD

The subject matter disclosed herein generally relates to wireless communications, and more particularly relates to frequency hopping.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Next Generation Node B (gNB), Orthogonal Frequency Division Multiplexing (OFDM), Radio Resource Control (RRC), Reference Signal (RS), Time-Division Duplex (TDD), Time Division Multiplex (TDM), User Entity/Equipment (Mobile Terminal) (UE), Uplink (UL), Universal Mobile Telecommunications System (UMTS), Internet-of-Things (IoT), Narrowband Internet-of-Things (NB-IoT or NBIoT), Long Term Evolution (LTE), Narrowband (NB), Physical Downlink Shared Channel (PDSCH), Physical Uplink Shared Channel (PUSCH), Downlink control information (DCI), Physical Resource Block (PRB), Universal Mobile Telecommunications System (UMTS), Evolved-UMTS Terrestrial Radio Access (E-UTRA or EUTRA), Narrowband physical downlink shared channel (NPDSCH), Narrowband physical downlink control channel (NPDCCH), Narrowband Physical Uplink Shared Channel (NPUSCH), Narrowband Physical Random Access Channel (NPRACH), system frame number (SFN), DeModulation Reference Signal (DMRS).

In NBIoT, frequency hopping among carriers (including anchor carrier and non-anchor carriers) would be beneficial on performance for narrowband system, at least for unicast channels such as NPDSCH and NPUSCH and even NPDCCH.

BRIEF SUMMARY

Methods and apparatuses for NBIoT frequency hopping are disclosed.

In one embodiment, a method comprises receiving a signal on a first number of frequency carriers, the signal switches among the first number of frequency carriers every a second number of time unit, wherein, the second number is configured by higher layer signaling, and the second number is determined by at least one of a subcarrier spacing of the signal, a scaling factor, a resource unit size of the signal, a subcarrier allocation. In one embodiment, the first number is configured by higher layer signaling In some embodiment, the subcarrier spacing of the signal may be 3.75 kHz or 15 kHz. In some embodiment, the scaling factor is configured by higher layer signaling. In addition, the scaling factor is determined by the subcarrier spacing of the signal.

In some embodiment, the time unit is consecutive absolute subframe. In other embodiment, the time unit is valid subframe.

In some embodiment, part of symbol(s) of the signal is punctured when the signal switches among the frequency carriers. In particular, part of symbol(s) of the signal is punctured when the signal switches among the frequency carriers. The punctured symbol includes a last third number and a half symbol(s) of a previous carrier and a first fourth number and a half symbol of the next carrier. In some embodiment, the third number is equal to 0 or 1 or 2. In some embodiment, the fourth number is equal to 0 or 1 or 2.

In some embodiment, the time unit is a fifth number of a symbol group. The symbol group may contain four symbols. In addition, the symbol group may be 1.4 ms or 1.6 ms.

In one embodiment, a method comprises transmitting a signal on a first number of frequency carriers, the signal switches among the first number of frequency carriers every a second number of time unit, wherein, the second number is configured by higher layer signaling, and the second number is determined by at least one of a subcarrier spacing of the signal, a scaling factor, a resource unit size of the signal, a subcarrier allocation.

In another embodiment, a base unit comprises a receiver that receives a signal on a first number of frequency carriers, the signal switches among the first number of frequency carriers every a second number of time unit, wherein, the second number is configured by higher layer signaling, and the second number is determined by at least one of a subcarrier spacing of the signal, a scaling factor, a resource unit size of the signal, a subcarrier allocation.

In yet another embodiment, a remote unit comprises a transmitter that transmits a signal on a first number of frequency carriers, the signal switches among the first number of frequency carriers every a second number of time unit, wherein, the second number is configured by higher layer signaling, and the second number is determined by at least one of a subcarrier spacing of the signal, a scaling factor, a resource unit size of the signal, a subcarrier allocation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

(1) NPDCCH and NPDSCH frequency hopping:

For NPDCCH and NPDSCH frequency hopping, signal switches (hops) among frequency carriers every X consecutive absolute subframes. X is configured by RRC signaling. If the number of bits for configuring X is 2, X may have four possible values, e.g., X={1, 2, 4, 8}. The frequency carriers to be switched are selected from a carrier set configured by RRC signaling.

(2) NPUSCH frequency hopping:

The frequency hopping for NPUSCH is different for different NPUSCH formats, e.g., NPUSCH format 1 and NPUSCH format 2.

For NBIoT, NPUSCH has format 1 and format 2. NPUSCH format 1 is used for uplink data transmission. Two types of subcarrier spacing are supported for NPUSCH format 1. For subcarrier spacing of 3.75 kHz in NPUSCH format 1, only single carrier (or single tone) is supported; for subcarrier spacing of 15 kHz in NPUSCH format 1, single tone, 3-tone, 6-tone and 12-tone are supported. NPUSCH format 2 is used for ACK/NACK feedback. Two types of subcarrier spacing are also supported for NPUSCH format 2. For subcarrier spacing of each of 3.75 kHz and 15 kHz in NPUSCH format 2, only single tone is supported.

The below Table 1 shows the supported combinations of $\Delta f$, $N_{sc}^{RU}$, $N_{slots}^{UL}$ and $N_{symb}^{UL}$ for frame structure type 1.

TABLE 1

Supported combinations of $N_{sc}^{RU}$, $N_{slots}^{UL}$, and $N_{symb}^{UL}$ for frame structure type 1.

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 (32 ms) | 7 |
|   | 15 kHz | 1 | 16 (8 ms) |   |
|   |   | 3 | 8 (4 ms) |   |
|   |   | 6 | 4 (2 ms) |   |
|   |   | 12 | 2 (1 ms) |   |
| 2 | 3.75 kHz | 1 | 4 (8 ms) |   |
|   | 15 kHz | 1 | 4 (2 ms) |   |

In the above Table, $\Delta f$ is subcarrier spacing; $N_{sc}^{RU}$ is the number of tones for one resource unit; $N_{slots}^{UL}$ is the number of slots for each resource unit; and $N_{symb}^{UL}$ is the number of symbols in one slot.

Figure 1:
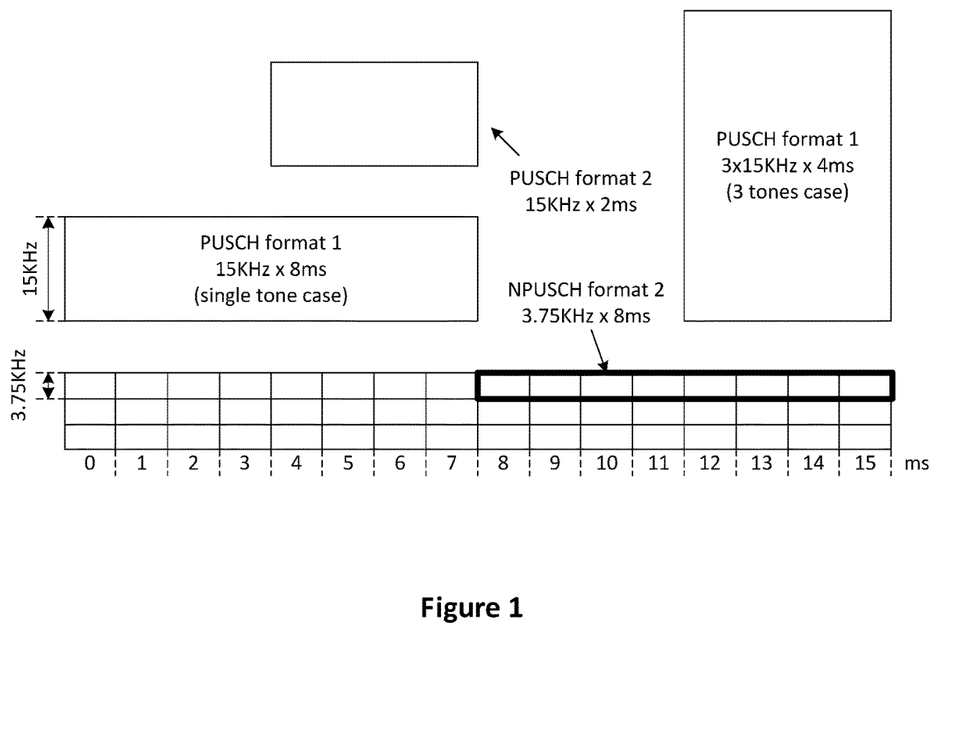
FIG. 1 illustrates some examples of NBIoT uplink structures in PUSCH format 1 or 2.

FIG. 1 illustrates some examples of NBIoT uplink structures in PUSCH format 1 or 2. In particular, for NPUSCH format 1, single tone ($N_{sc}^{RU}=1$) for subcarrier spacing of 15 kHz and 3-tone ($N_{sc}^{RU}=3$) for subcarrier spacing of 15 kHz are shown; and for NPUSCH format 2, subcarrier spacing of 3.75 kHz and subcarrier spacing of 15 kHz are shown.

(2-1) NPUSCH format 1 frequency hopping:

For NPUSCH format 1 frequency hopping, gNB configures at least 2 carriers for uplink data transmission. The carriers are configured by RRC signaling.

NPUSCH signal may be switched (hopped) every X consecutive absolute subframe(s). X is configured by higher layer signaling.

As described above, for NPUSCH format 1, two types of subcarrier spacing are supported: 3.75 kHz and 15 kHz. Resource unit sizes are different for different types of subcarrier spacing. As shown in Table 1, when subcarrier spacing is 3.75 kHz, a slot duration is 2 ms, and the resource unit size is 16 slots (or 32 ms). When subcarrier spacing is 15 kHz, a slot duration is 0.5 ms, and the resource unit size for the subcarrier spacing of 15 kHz with single tone is 16 slots (or 8 ms) while the resource unit size for the subcarrier spacing of 15 kHz with 3-tone is 8 slots (or 4 ms).

X may be determined according to different methods.

According to a first method, X is determined according to the subcarrier spacing of uplink data (NPUSCH format 1 or format 2 signal). Suppose the number of bits for indicating X is 2, X may have four possible values. For example, when the subcarrier spacing of uplink data is 3.75 kHz, X may be equal to 4 or 8 or 16 or 32 (represented as {4 8 16 32} hereinafter) consecutive absolute subframes. When the subcarrier spacing of uplink data is 15 kHz, X may be equal to {1 2 4 8} consecutive absolute subframe(s).

According to a variety of the first method, X may be set as kY, in which Y={1 2 4 8} and k is a scaling factor and determined by the subcarrier spacing of uplink data. For example, when the subcarrier spacing of uplink data is 3.75 kHz, k=4; and when the subcarrier spacing of uplink data is 15 kHz, k=1.

According to another variety of the first method, when the subcarrier spacing equals $15*2^{(-\mu)}$, X is set as $2^{(\mu)}*Y$ where Y={1 2 4 8}. That is, when the subcarrier spacing of uplink data is 15 kHz, $\mu$=0, so X=Y={1 2 4 8}. When the subcarrier spacing of uplink data is 3.75 kHz, $\mu$=2, so X=4*Y={4 8 16 32}.

According to a second method, X is determined by the resource unit size of uplink data in units of ms (or in units of the number of subframes). That is, X={1 2 4 8}*RU. As shown in Table 1, RU=32 ms for subcarrier of 3.75 kHz with single tone for NPUSCH format 1. For another example, RU=2 ms for subcarrier of 15 kHz with 6 tones for NPUSCH format 1. RU=1 ms for subcarrier of 15 kHz with 12 tones for NPUSCH format 1.

According to a third method, X is determined by the subcarrier allocation. For example, in case of subcarrier of 15 kHz, X={1,2,4,8} for 12-tone allocation, X={2 4 8 16} for 6-tone allocation, X={4 8 16 32} for 3-tone allocation and X={8 16 32 64} for single tone allocation. For example, if the number of repetitions configured by gNB is 16, uplink data transmission for 3-tone allocation for NPUSCH format 1 would use 8*16 slots while uplink data transmission for 12-tone allocation for NPUSCH format 1 would use 2*16 slots. If hopping number is set to 4, the 3-tone allocation would hop every 2*4=8 slots while the 12-tone allocation would hop every 0.5*4=2 slots. Therefore, compared to the situation that X is determined as a fixed number of subframes (slots), it is beneficial that X is determined according to tone allocation, e.g., determined as 8 slots for 3-tone allocation, and determined as 2 slots for 12-tone allocation). Therefore, the determination of X according to the subcarrier tone allocation can reduce the frequency hopping number.

In the first to the third methods, X is counted based on consecutive absolute subframes.

The subframes may be configured as valid or invalid. Some subframes may be configured by the gNB as invalid for various reasons. In the condition that absolute subframes are counted as a basis for determining X, it is easy to align the frequency hopping for different UEs. However, the DMRS transmitted in NPUSCH may be broken when absolute subframes are counted as a basis for determining X, especially for 3.75 kHz subcarrier spacing.

According to a different implementation for NPUSCH format 1 frequency hopping, frequency hopping may be switched (hopped) every X' valid subframe(s) or X' valid resource unit time.

Figure 2A:
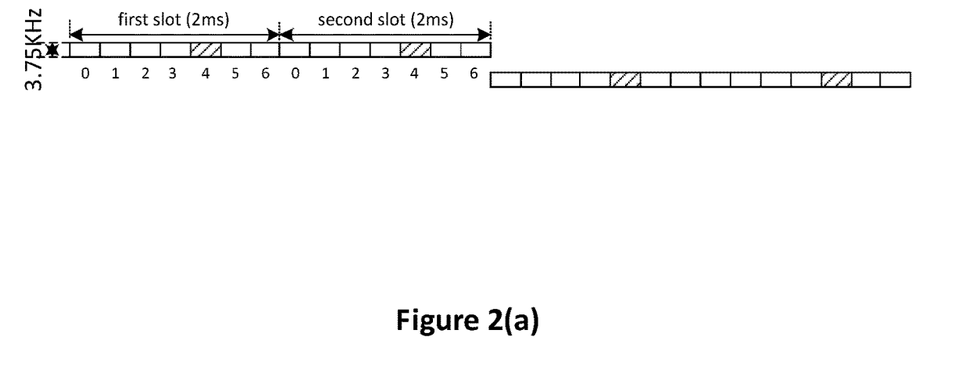
FIGS. 2(a) and 2(b) illustrate NBIoT uplink structure with DMRS.
Figure 2B:
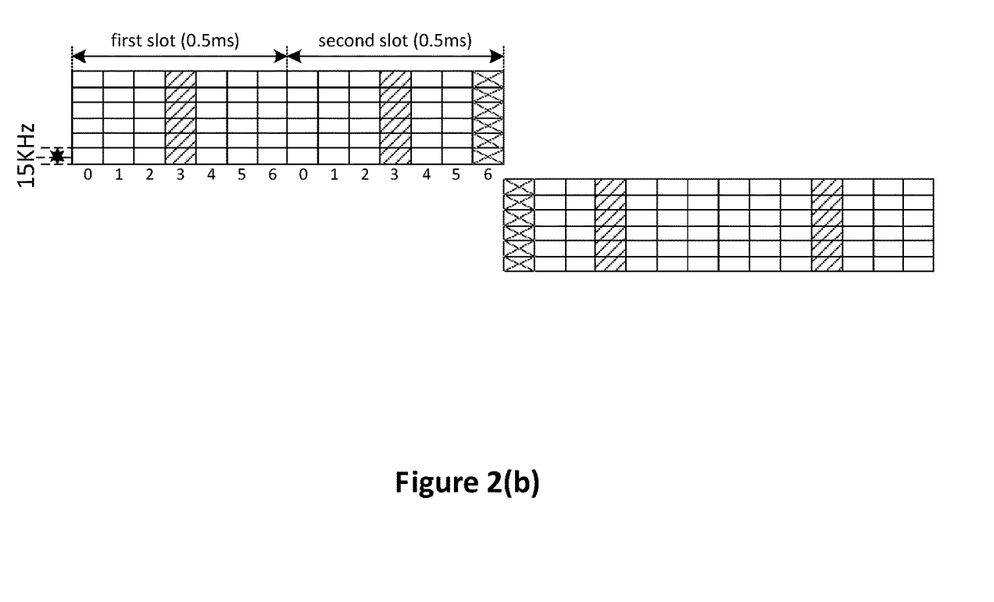

FIGS. 2(a) and 2(b) illustrate NBIoT uplink structure with DMRS. FIG. 2(a) illustrates that, for NPUSCH format 1, for subcarrier spacing of 3.75 kHz, DMRS is transmitted in symbol #4 in each 2 ms NB slot.

FIG. 2(b) illustrates that, for subcarrier spacing of 15 kHz, DMRS is transmitted in symbol #3 in each 0.5 ms slot. In FIG. 2(b), the 6-tone frame structure is illustrated. Incidentally, for single tone frame structure, 3-tone frame structure, and 12-tone frame structure in the condition of subcarrier spacing of 15 kHz is also transmitted in symbol #3 in each 0.5 ms slot.

When frequency hopping is configured, some symbol(s) is/are to be punctured for the requirement of minimal frequency retuning time. UE will retune to another frequency carrier within the minimal frequency retuning time, so the minimal frequency retuning time can't be used for uplink transmission. Accordingly, the corresponding uplink symbol will be punctured. In NBIot, the minimal frequency retuning time is related to the UE capability It can be configured as 1 symbol or 2 symbols. As described above, the frequency hopping occurs every X consecutive absolute subframe(s) or every X' valid subframe(s). Each subframe is 1 ms. Therefore, the symbol(s) to be punctured when frequency hopping for NPUSCH format 1 occurs may be determined on the basis of the subcarrier spacing of uplink data.

For subcarrier spacing of 15 kHz, the DMRS symbol is transmitted in symbol #3 in each 0.5 ms slot, while the frequency hopping happens in a 1 ms granularity which is aligned with the granularity of NBIoT valid/invalid subframe pattern (e.g., valid/invalid subframe pattern of 40 bits with 40 ms period). Therefore, the puncture symbol(s) due to the frequency hopping would not be DMRS symbols. In particular, the frequency hopping can only happen between adjacent two 1 ms-cycles. If 2-symbols frequency retuning time is considered (i.e. two symbols are to be punctured), the last symbol in the previous carrier (the carrier before frequency hopping) and first symbol in the second carrier (the carrier after frequency hopping) may be punctured (marked as "X" in FIG. 2(b)).

For subcarrier spacing of 3.75 kHz, the NB slot is 2 ms with 7 symbols including one DMRS. The frequency hopping also happens in a 1 ms granularity. Therefore, the puncture symbol(s) due to the frequency hopping may possibly include DMRS symbols. In order to protect the DMRS completeness, the puncture symbol(s) should be determined by the frequency hopping position (or referred to as switch position).

There are two options for determining the puncture symbol(s). For Option 11, last Z symbol(s) in the previous carrier (carrier before frequency hopping) is/are punctured. Z may be set to 1 or 2.

For Option 12, last Z and a half symbol(s) in the previous carrier (carrier before frequency hopping) and first S and a half symbol(s) in the next carrier (carrier after frequency hopping) are punctured. For example, when Z=1 and S=0, a total of two symbols are punctured. For another example, when Z=0 and S=0, a total of one symbol is punctured. That is, when the total is one symbol, a last half symbol in the previous carrier (carrier before frequency hopping) and a first half symbol in the next carrier (carrier after frequency hopping) are punctured.

Option 11 or Option 12 is determined according to frequency hopping position. The frequency hopping position includes the middle of the 2 ms NB slot and the end (or start) of the 2 ms NB slot.

Figure 3:
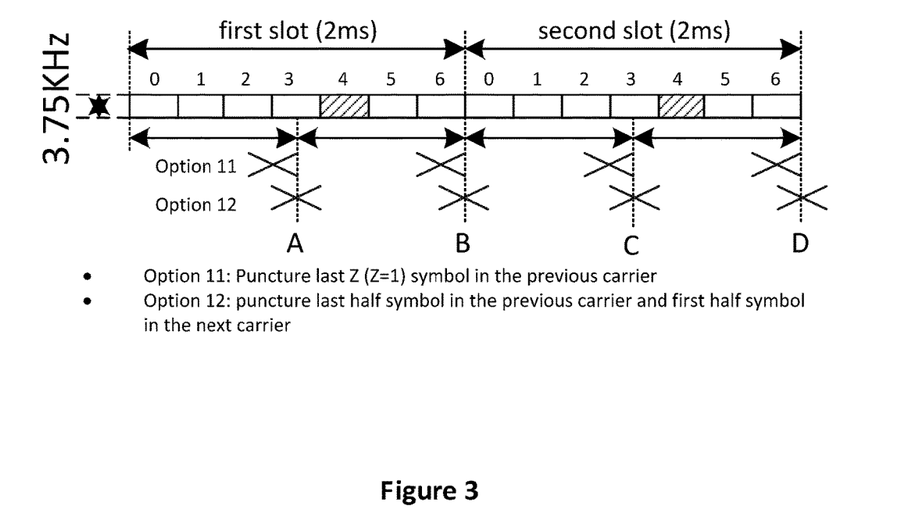
FIG. 3 illustrates symbol puncture for NPUSCH format 1 subcarrier spacing of 3.75 kHz.

FIG. 3 illustrates symbol puncture for NPUSCH format 1 subcarrier spacing of 3.75 kHz, in which first slot and second slot are shown. In FIG. 3, only one symbol is punctured for each possible frequency hopping. In other word, for Option 11, Z=1; and for Option 12, Z=0 and S=0. As described above, the frequency hopping granularity is 1 ms. Therefore, frequency hopping may happen at every 1 ms. Therefore, within the first and second slots=4 ms, frequency hopping may happen at any of four positions A, B, C and D.

For subcarrier spacing of 3.75 kHz, there are 7 symbols (symbols #0-#6) for each NB slot (2 ms). Therefore, Positions A and C are located at half of the NB slot. Specifically, Position A is located at the middle of symbol #3 of the first slot, and Position C is located at the middle of symbol #3 of the second slot. Positions B and D are located at the start (or end) of NB slot. Specifically, Position B is located at the end of symbol #6 of the first slot (or the start of symbol #0 of the second slot), and Position D is located at the end of symbol #6 of the second slot (or the start of symbol #0 of the not-shown next slot).

In FIG. 3, the possible punctured symbol for Option 11 and Option 12 are illustrated for each of positions A to D.

Position A is located in the middle of symbol #3 of the first slot. For Option 11, last Z (Z=1) symbol in the previous carrier (carrier before frequency hopping) is punctured. The one symbol is composed of the last half of symbol #2 and the first half of symbol #3 of the first slot. For Option 12, a last half symbol in the previous carrier (carrier before frequency hopping) and a first half symbol in the next carrier (carrier after frequency hopping) (i.e. Z=0 and S=0) are punctured. The half symbol in the previous carrier is the first half of symbol #3 of the first slot, and the half symbol in the next carrier is the last half of symbol #3 of the first slot. Therefore, for Option 12, symbol #3 of the first slot is punctured.

Position B is located at the end of symbol #6 of the first slot. For Option 11, symbol #6 is punctured. For Option 12, the last half of symbol #6 of the first slot and the first half of symbol #0 of the second slot are punctured.

Position C is located in the middle of symbol #3 of the second slot. For Option 11, the last half of symbol #2 of the second slot and the first half of symbol #3 of the second slot are punctured. For Option 12, symbol #3 of the second slot is punctured.

Position D is located at the end of symbol #6 of the second slot. For Option 11, symbol #6 of the second slot is punctured. For Option 12, the last half of symbol #6 of the second slot and the first half of the symbol #0 of the not-shown next slot are punctured.

As DMRS is transmitted at the same symbol in each NB slot (i.e. symbol #4 for subcarrier spacing of 3.75 kHz for NPUSCH format 1), the above-identified Positions C and D are substantially the same as Positions A and B.

It is preferable that Option 11 is adopted for Positions B and D, and Option 12 is adopted for Positions A and C.

(2-2) NPUSCH format 2 frequency hopping:

For NPUSCH format 2 frequency hopping, gNB configures at least 2 carriers for uplink data transmission. The carriers are configured by RRC signaling.

Frequency carrier may be switched (hopped) every X consecutive absolute subframes or X' valid subframes. X or X' is configured by higher layer signaling. The determination of X or X' is the same as that for NPUSCH format 1.

Figure 4:
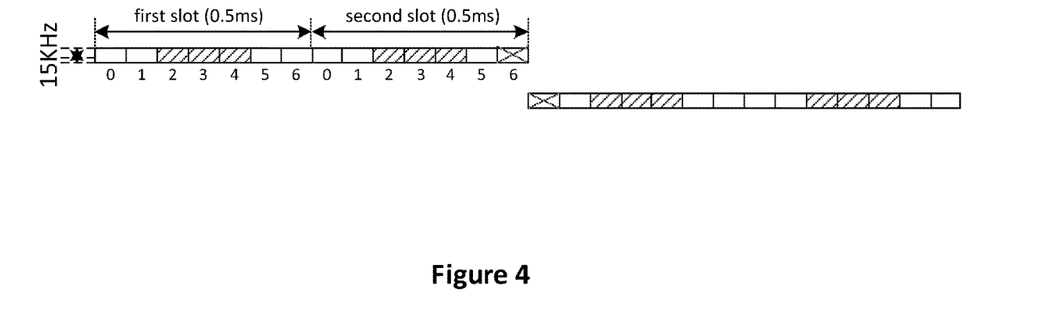
FIG. 4 illustrates symbol puncture for NPUSCH format 2 subcarrier spacing of 15 kHz.

FIG. 4 illustrates symbol puncture for NPUSCH format 2 subcarrier spacing of 15 kHz, in which the first and second slots (1 ms) are shown. As can be seen from FIG. 4, the DMRS symbol is transmitted in symbols #2-#4 in each 0.5 ms slot.

The granularity of frequency hopping is 1 ms. Therefore, similar to the symbol puncture for NPUSCH format 1 for subcarrier spacing of 15 kHz, the puncture symbol(s) due to the frequency hopping would not be DMRS symbols. If 2 symbols retuning time is considered, the last symbol in the previous carrier (the carrier before frequency hopping) and first symbol in the next carrier (the carrier after frequency hopping) may be punctured (marked as "X" in FIG. 4).

Figure 5:
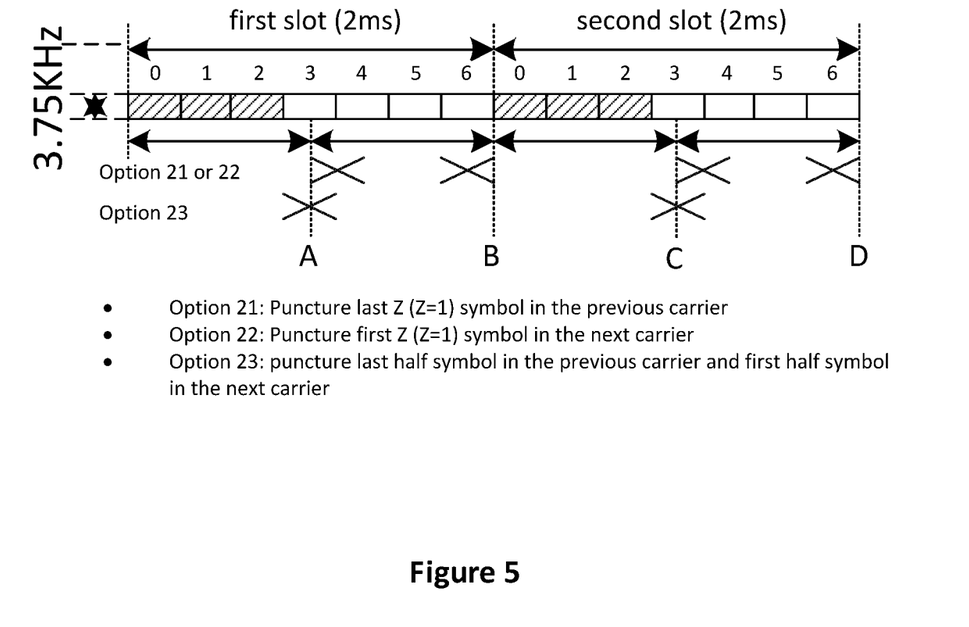
FIG. 5 illustrates symbol puncture for NPUSCH format 2 subcarrier spacing of 3.75 kHz.

FIG. 5 illustrates symbol puncture for NPUSCH format 2 subcarrier spacing of 3.75 kHz, in which the first and second slots (4 ms) are shown. The granularity of frequency hopping is 1 ms. For subcarrier spacing of 3.75 kHz, the DMRS symbol is transmitted in symbols #0-#2 in each 2 ms NB slot.

Similar to FIG. 3, within the first and the second slots of 4 ms, frequency hopping may happen at any of four positions A, B, C and D, in which Position A is located at the middle of symbol #3 of the first slot, Position B is located at the end of symbol #6 of the first slot (or the start of symbol #0 of the second slot), Position C is located at the middle of symbol #3 of the second slot, and Position D is located at the end of symbol #6 of the second slot (or the start of symbol #0 of the not-shown next slot).

There are three options for determining the puncture symbol(s) for NPUSCH format 2 subcarrier spacing of 3.75 kHz.

In Option 21, last Z symbol(s) in the previous carrier (carrier before frequency hopping) is/are punctured. Z may be set to 1 or 2.

In Option 22, first Z symbol(s) in the next carrier (carrier after frequency hopping) is/are punctured. Z may be set to 1 or 2.

In Option 23, last Z and a half symbol(s) in the previous carrier (carrier before frequency hopping) and first S and a half symbol(s) in the next carrier (carrier after frequency hopping) are punctured. For example, when Z=0 and S=1, a total of two symbols are punctured. For another example, when Z=0 and S=0, a total of one symbol is punctured.

Option 21 or Option 22 or Option 23 is determined according to frequency hopping position.

In FIG. 5, the possible punctured symbol for Option 21 or 22 and Option 23 are illustrated for each of positions A to D. In FIG. 5, only one symbol is punctured for each frequency hopping. In other word, for Option 21, Z=1; for Option 22, Z=1; and for Option 23, Z=0 and S=0.

Position A is located in the middle of symbol #3 of the first slot. Option 21 (last Z symbol(s) in the previous carrier (carrier before frequency hopping) is/are punctured) does not apply for Position A because, even for Z=1, the punctured one symbol on the basis of position A would start from the last half of symbol #2 of the first slot which is a part of DMRS symbol. As DMRS symbol can NOT be punctured, Option 21 does not apply for Position A. For Option 22, the last half of symbol #3 and the first half of symbol #4 of the first slot are punctured (Z=1). For Option 23, symbol #3 of the first slot (composed of a last half symbol in the previous carrier and a first half symbol in the next carrier) is punctured.

Position B is located at the end of symbol #6 of the first slot (or the start of symbol #0 of the second slot). For Option 21, symbol #6 of the first slot is punctured. As DMRS is transmitted at symbol #0 of the second slot, neither Option 22 nor Option 23 applies for Position B.

Position C is located in the middle of symbol #3 of the second slot. Option 21 does not apply for Position C because DMRS is transmitted at symbol #2 of the second slot. For Option 22, the last half of symbol #3 and the first half of symbol #4 of the second slot are punctured (Z=1). For Option 23, symbol #3 of the second slot is punctured.

Position D is located at the end of symbol #6 of the second slot (or the start of symbol #0 of the not-shown next slot). For Option 21, symbol #6 of the second slot is punctured. As DMRS would be transmitted at symbol #0 of the not-shown next slot, neither Option 22 nor Option 23 applies for Position D.

As DMRS is transmitted at the same symbols in each NB slot (i.e. symbols #0-#2 for subcarrier spacing of 3.75 kHz for NPUSCH format 2), the above-identified Positions C and D are substantially the same as Positions A and B.

Preferably, Option 23 is adopted for Positions A and C, and Option 21 is adopted for Positions B and D.

(3) NPRACH frequency hopping:

For NPRACH frequency hopping, inter-carrier frequency hopping and intra-carrier frequency hopping are adopted.

Figure 6:
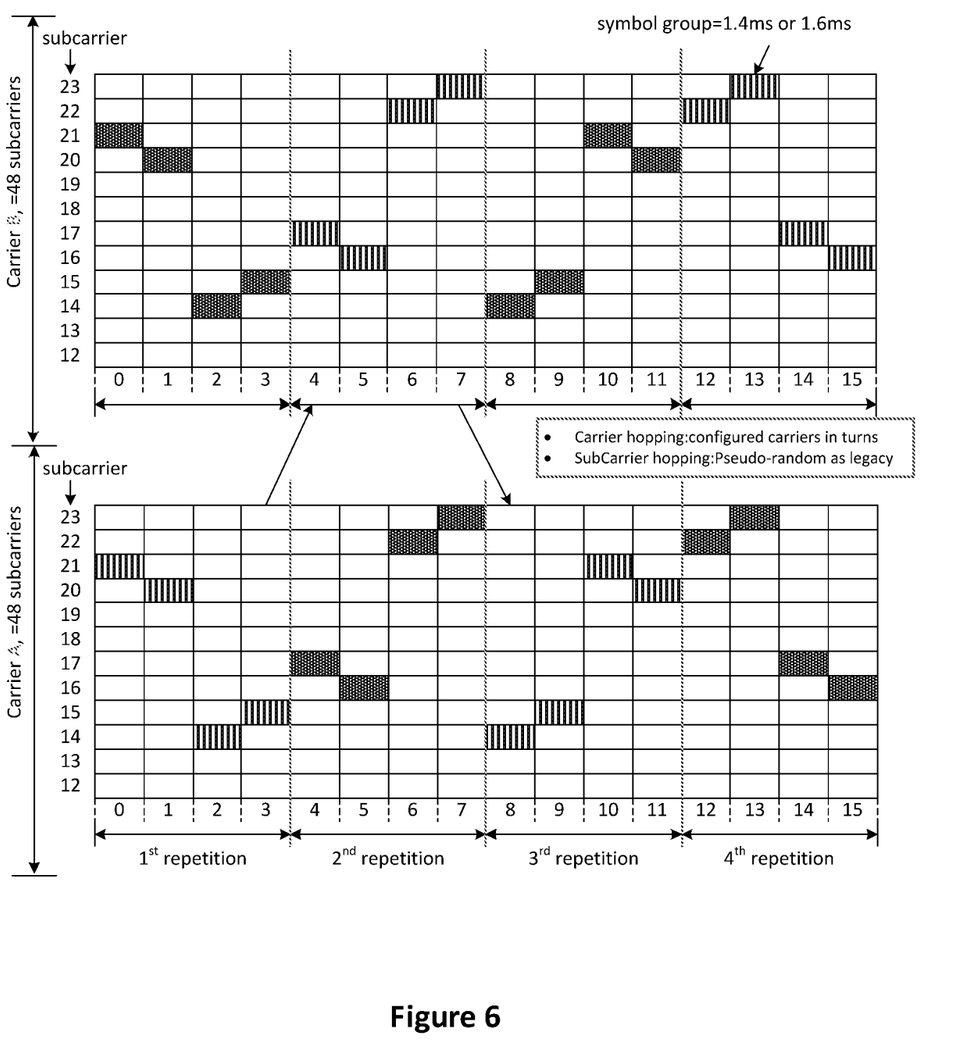
FIG. 6 illustrates NPRACH frequency hopping.

As illustrated in FIG. 6, 4 symbols are combined as a 4-symbol group, which may be 1.4 ms or 1.6 ms. The frequency hopping among carriers occurs every RX absolute 4-symbol group(s). RX is configured by RRC signaling. For example, RX may be set to 1 or 2. In FIG. 6, RX=1. gNB configures at least 2 carriers for NPRACH frequency hopping. In FIG. 6, carriers A and B are configured.

Each carrier has a plurality of subcarriers (for example, 48 in FIG. 6). Among the plurality of subcarriers, some subcarriers (e.g. subcarrier 12~subcarrier 23 in FIG. 6) may be configured as RACH resources.

As shown in FIG. 6, in the first repetition, NPRACH is transmitted in Carrier A (in particular, in subcarrier 21 for symbol #0, in subcarrier 20 for symbol #1, in subcarrier 14 for symbol #2 and in subcarrier 15 for symbol #3). In the second repetition, NPRACH is hopped to Carrier B (in particular, in subcarrier 17 for symbol #4, in subcarrier 16 for symbol #5, in subcarrier 22 for symbol #6 and in subcarrier 23 for symbol #7). In the third repetition, NPRACH is hopped back to Carrier A (in particular, in subcarrier 14 for symbol #8, in subcarrier 15 for symbol #9, in subcarrier 21 for symbol #10 and in subcarrier 20 for symbol #11). In the fourth repetition, NPRACH is hopped back to Carrier B (in particular, in subcarrier 22 for symbol #12, in subcarrier 23 for symbol #13, in subcarrier 17 for symbol #14 and in subcarrier 16 for symbol #15).

As described above, NPRACH is transmitted in different subcarriers for the symbols within the 4-symbol group. This is intra-carrier frequency hopping, or frequency hopping within carrier. The intra-carrier frequency hopping follows legacy pseudo-random hopping. For example, in the first repetition, the pseudo-random hopping pattern is −1 (hopping from subcarrier 21 for symbol #0 to subcarrier 20 for symbol #1), −6 (hopping from subcarrier 20 for symbol #1 to subcarrier 14 for symbol #2) and 1 (hopping from subcarrier 14 for symbol #2 to subcarrier 15 for symbol #3).

FIG. 6 illustrates one hopping pattern of Carrier A→Carrier B→Carrier A→Carrier B for one UE, as described above. FIG. 6 also illustrates another hopping pattern of Carrier B→Carrier A→Carrier B→Carrier A that may be used for another UE.

Figure 7:
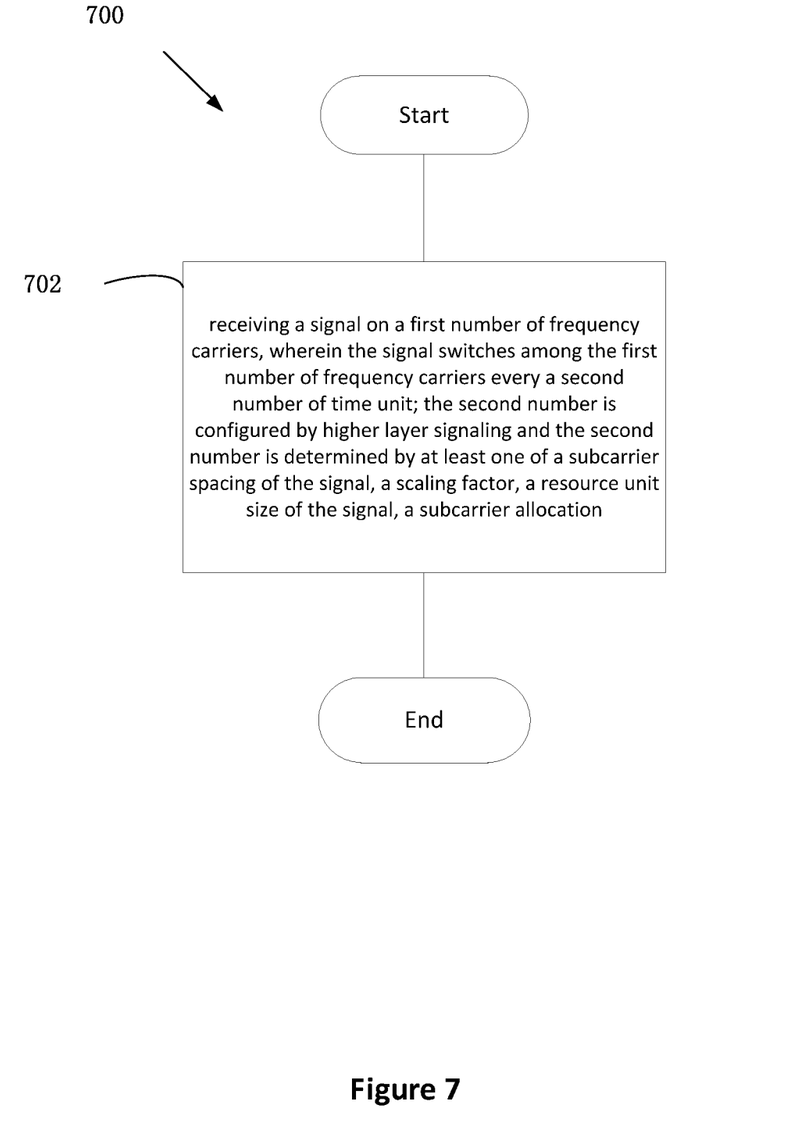
FIG. 7 is a schematic flow chart diagram illustrating an embodiment of a method for NBIoT frequency hopping.

FIG. 7 is a schematic flow chart diagram illustrating an embodiment of a method 700 for frequency hopping. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include 702 receiving a signal on a first number of frequency carriers, wherein the signal switches among the first number of frequency carriers every a second number of time unit; the second number is configured by higher layer signaling and the second number is determined by at least one of a subcarrier spacing of the signal, a scaling factor, a resource unit size of the signal, a subcarrier allocation.

Figure 8:
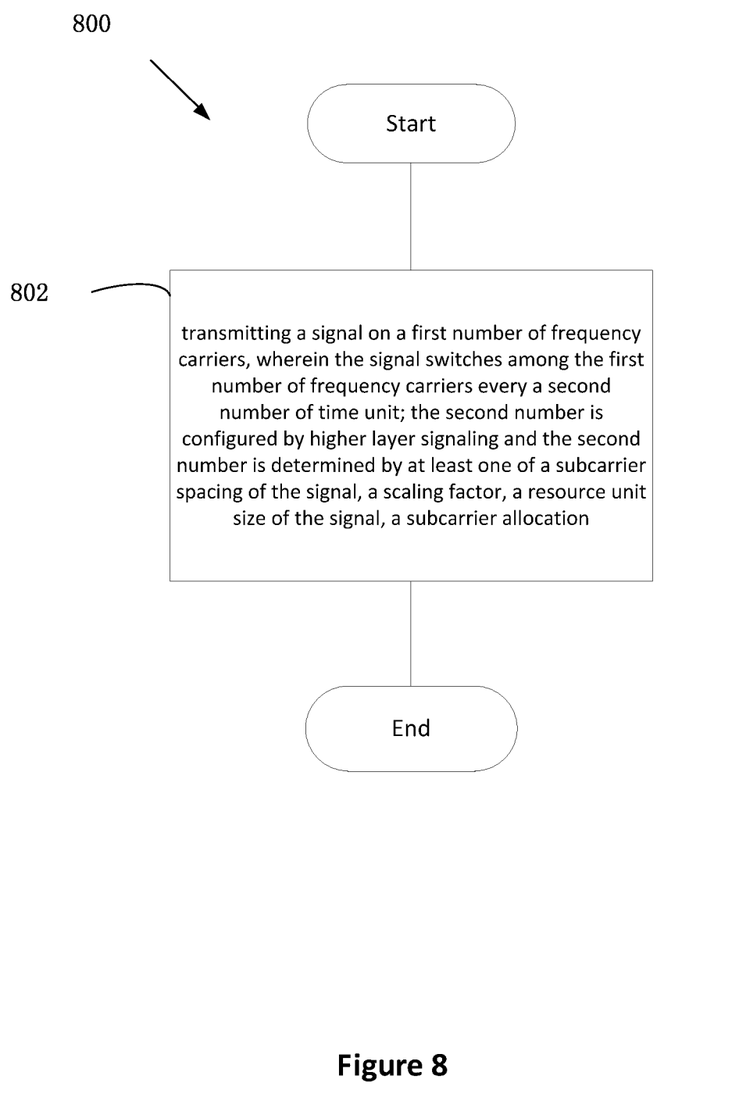
FIG. 8 is a schematic flow chart diagram illustrating a further embodiment of a method for NBIoT frequency hopping.

FIG. 8 is a schematic flow chart diagram illustrating an embodiment of a method 800 for frequency hopping. In some embodiments, the method 800 is performed by an apparatus, such as a remote unit (UE). In certain embodiments, the method 800 may be performed by a processor executing program code, for example, a microcontroller, a microprocessor, a CPU, a GPU, an auxiliary processing unit, a FPGA, or the like.

The method 800 may include 802 transmitting a signal on a first number of frequency carriers, wherein the signal switches among the first number of frequency carriers every a second number of time unit; the second number is configured by higher layer signaling and the second number is determined by at least one of a subcarrier spacing of the signal, a scaling factor, a resource unit size of the signal, a subcarrier allocation.

Figure 9:
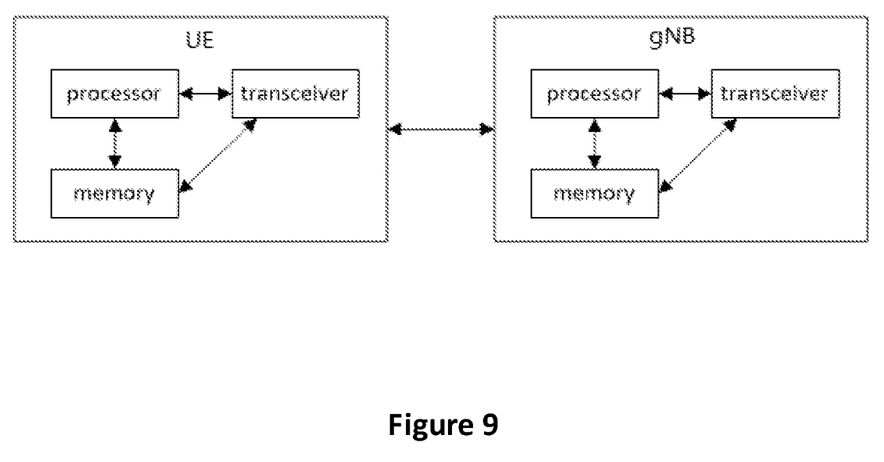
FIG. 9 is a schematic block diagram illustrating apparatuses according to one embodiment.

FIG. 9 is a schematic block diagram illustrating apparatuses according to one embodiment.

Referring to FIG. 9, the UE (i.e. the remote unit) includes a processor, a memory, and a transceiver. The processor implements a function, a process, and/or a method which are proposed in FIG. 8. The gNB (i.e. base unit) includes a processor, a memory, and a transceiver. The processors implement a function, a process, and/or a method which are proposed in FIG. 7. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

transmitting a signal on a first number of frequency carriers, wherein the signal switches among the first number of frequency carriers every second number of time units, wherein the second number of time units is configured by higher layer signaling, and the second number of time units is determined by a scaling factor, a quantity of slots per resource unit of the signal, a subcarrier allocation, or some combination thereof.

2. The method of claim 1, wherein the first number is configured by higher layer signaling.

3. The method of claim 1, wherein the signal has a subcarrier spacing that includes 3.75 kHz and 15 kHz.

4. The method of claim 1, wherein the scaling factor is configured by higher layer signaling.

5. A base station, comprising:

at least one memory; and at least one processor coupled with the at least one memory and configured to cause the base station to receive a signal on a first number of frequency carriers, wherein the signal switches among the first number of frequency carriers every second number of time units, wherein the second number of time units is configured by higher layer signaling, and the second number of time units is determined by a scaling factor, a quantity of slots per resource unit of the signal, a subcarrier allocation, or some combination thereof.

6. A user equipment (UE), comprising:

at least one memory; and at least one processor coupled with the at least one memory and configured to cause the UE to transmit a signal on a first number of frequency carriers, wherein the signal switches among the first number of frequency carriers every second number of time units, wherein the second number of time units is configured by higher layer signaling, and the second number of time units is determined by a scaling factor, a quantity of slots per resource unit of the signal, a subcarrier allocation, or some combination thereof.

7. The user equipment of claim 6, wherein the first number is configured by higher layer signaling.

8. The user equipment of claim 6, wherein the signal has a subcarrier spacing that includes 3.75 kHz and 15 kHz.

9. The user equipment of claim 6, wherein the scaling factor is configured by higher layer signaling.

10. The user equipment of claim 6, wherein the scaling factor is determined by a subcarrier spacing of the signal.

11. The user equipment of claim 6, wherein the time unit is a consecutive absolute subframe.

12. The user equipment of claim 6, wherein the time unit is a valid subframe.

13. The user equipment of claim 6, wherein part of symbols of the signal are punctured if the signal switches among the frequency carriers.

14. The user equipment of claim 13, wherein the punctured symbol is determined by a subcarrier spacing of the signal, a switch position of the signal, or the combination thereof.

15. The user equipment of claim 13, wherein the punctured symbol includes a last third number, a half symbol of a previous carrier, a first fourth number, and a half symbol of the next carrier.

16. The user equipment of claim 15, wherein the third number is equal to 0, 1, or 2.

17. The user equipment of claim 15, wherein the fourth number is equal to 0, 1, or 2.

18. The user equipment of claim 6, wherein the time unit is a fifth number of a symbol group.

19. The user equipment of claim 18, wherein the symbol group contains four symbols.

20. The user equipment of claim 18, wherein the symbol group is 1.4 ms or 1.6 ms.

* * * * *